(12) United States Patent  (10) Patent No.: US 7,629,721 B2
Yukitake  (45) Date of Patent: Dec. 8, 2009

(54) STATOR OF MOTOR

(75) Inventor: Yasuhiro Yukitake, Kashiwara (JP)

(73) Assignee: JTEKT Corporation, Osaka-shi, Osaka (JP)

(*) Notice: Subject to any disclaimer, the term of this patent is extended or adjusted under 35 U.S.C. 154(b) by 0 days.

(21) Appl. No.: 11/709,760

(22) Filed: Feb. 23, 2007

(65) Prior Publication Data

US 2007/0200450 A1 Aug. 30, 2007

(30) Foreign Application Priority Data

Feb. 28, 2006 (JP) .................. P2006-052302

(51) Int. Cl.
H02K 23/40 (2006.01)
H02K 3/00 (2006.01)

(52) U.S. Cl. .................. 310/194; 310/214; 310/216

(58) Field of Classification Search .......... 310/194, 310/214, 216, 67 R, 259
See application file for complete search history.

(56) References Cited

U.S. PATENT DOCUMENTS

| | | | | | |
|---|---|---|---|---|---|
| 3,780,323 | A | * | 12/1973 | Swain | 310/43 |
| 5,604,389 | A | * | 2/1997 | Nitta et al. | 310/67 R |
| 5,798,583 | A | * | 8/1998 | Morita | 310/42 |
| 6,057,625 | A | * | 5/2000 | Stockman et al. | 310/215 |
| 6,087,755 | A | * | 7/2000 | Suzuki et al. | 310/254 |
| 6,211,595 | B1 | * | 4/2001 | Nose | 310/216 |
| 6,515,396 | B1 | * | 2/2003 | Fritzsche | 310/216 |
| 6,707,225 | B2 | * | 3/2004 | Bradfield | 310/260 |
| 6,759,784 | B1 | * | 7/2004 | Gustafson et al. | 310/254 |

FOREIGN PATENT DOCUMENTS

| | | | |
|---|---|---|---|
| JP | 07147745 A | * | 6/1995 |
| JP | 11150893 A | * | 6/1999 |
| JP | 2000-60046 | | 2/2000 |
| JP | 2002-369418 | | 12/2002 |
| WO | 2005/101612 A1 | | 10/2005 |

OTHER PUBLICATIONS

Japanese Office Action issued in JP 2006-052302 dated Sep. 1, 2009 (with English translation).

* cited by examiner

Primary Examiner—Quyen Leung
Assistant Examiner—Alex W Mok
(74) Attorney, Agent, or Firm—McGinn IP Law Group PLLC

(57) ABSTRACT

A stator of a motor according to the invention includes a stator core 1 annularly continued, a plurality of insulators each having a body part which is engaged with an outer peripheral surface of a tooth part of the stator core and a flange part which is projected at a distal end side of the tooth part, and a coil which is wound around the tooth part by way of the insulator. A first magnetic body is provided on a surface of the flange part of the insulator opposed to a rotor, in a state magnetically connected to the tooth part.

14 Claims, 5 Drawing Sheets

STATOR OF MOTOR

BACKGROUND OF THE INVENTION

The present invention relates to a stator of a motor such as a brushless motor of inner rotor type.

FIG. 6 is a sectional view of a part of a so-called inner rotor type brushless motor in which a rotor is disposed inside a stator so as to rotate, and FIG. 7 is an enlarged sectional view taken along a line (vii)-(vii) in FIG. 6.

A rotor 21 includes a rotor shaft 22, a rotor core 23 fixed to the rotor shaft 22, and a rotor magnet 24 which is provided on an outer peripheral surface of the rotor core 23 or inside thereof.

A stator 25 includes a stator core 26 which is annularly continued, and coils 28 which are respectively wound around tooth parts 26b projecting from the stator core 26 inward in a radial direction, by way of insulators 27.

The stator core 26 is formed of laminated magnetic steel sheets and includes a stator core body 26a in an annular shape, a plurality of tooth parts 26b which are projected inward in the radial direction from the stator core body 26a, equidistantly along an inner circumferential direction thereof. Each of the tooth parts 26b generally includes protruded parts 26c which are protruded to opposite sides in the circumferential direction at a distal end side thereof (a side opposed to the rotor).

Each of the insulators 27 which is clamped by the stator core 26 from opposite sides in an axial direction of the stator is formed of resin or the like, and has a body part 27a which is engaged with an outer peripheral surface of the tooth part 26b of the stator core 26, and a flange part 27b which is formed in at least one end of the body part 27a. The two body parts 27a, 27a which are adjacent to each other in the circumferential direction are annularly connected by means of a connecting part 27c.

Each of the coils 28 is fitted around the tooth part 26b of the stator core 26 by way of the aforesaid insulator 27. In assembling, the coil 28 is wound around the body part 27a of the insulator 27, after the body part 27a has been fitted to the tooth part 26b of the stator core 26 from opposite sides in the axial direction (Reference should be made to Patent Document 1). This method of winding is called as a concentrated winding method.

In the motor provided with the above described stator, an end surface of the distal end portion of the tooth part 26b including the protruded parts 26c functions as a magnetic pole surface of the stator, while an outer peripheral surface of the rotor magnet 24 functions as a magnetic pole face of the rotor.

By the way, in the above described stator 25, the end surface of the tooth part 26b which functions as the magnetic pole face of the stator spreads to opposite sides in the circumferential direction because of presence of the protruded parts 26c, but does not spread to opposite sides in the axial direction. As shown in FIG. 7, there is only the flange part 27b of the insulator 27 at opposite sides of the end surface of the tooth part 26b in the axial direction. For this reason, a part of a magnetic flux Mo from the rotor magnet 24 leaks through the flange part 27b, at opposite sides of the magnetic pole face of the stator in the axial direction. As the results, in the conventional stator 25 of this type, an entrapping rate of the magnetic flux from the rotor magnet 24 has been low, and this is considered to be one of causes for deterioration of rotation performance of the motor.

Moreover, spaces at opposite sides of the magnetic pole face of the stator in the axial direction have not been effectively utilized for the purpose of confining the magnetic flux, entrapping the magnetic flux, and preventing leakage, although the spaces are at coil ends, and these spaces have been magnetically useless spaces, in the prior art.

Patent Document 1: JP-A-2000-60046

SUMMARY OF THE INVENTION

The problems to be solved by this invention is to enhance an entrapping rate of a magnetic flux from a rotor magnet in a stator, by efficiently utilizing a space which has not been effectively used in the prior art, thereby to improve rotation performance of the motor.

In order to solve the above problem, the present invention is characterized by having the following arrangement.

(1) A stator of a motor comprising:
a annular stator core;
tooth parts that project inward from the stator core in a radial direction of the stator core, each of the tooth parts including a flange part that is protruded at a distal end side of the tooth part;
insulators each having a body part engaged with an outer peripheral surface of the tooth part;
coils, each wound around the tooth part by way of the insulator; and
first magnetic bodies, each provided on a surface of the flange part so as to opposed to a rotor, the first magnetic bodies being magnetically connected to the tooth part.

(2) The stator according to (1) further comprising second magnetic bodies, each provided on an inner periphery of the body part of the insulator and contacting with the outer peripheral surface of the tooth part, the second magnetic body being magnetically connected to the first magnetic body.

(3) The stator according to (1), wherein the tooth part includes protruded parts which are protruded from a distal end thereof to opposite sides in a circumferential direction of the stator, and the first magnetic body is provided at opposite sides of these protruded parts in an axial direction of the stator.

According to the invention, the first magnetic body is provided in the state magnetically connected to the tooth part of the stator, in a region where a part of the magnetic flux from the rotor magnet has leaked in the prior art. Consequently, an area of the magnetic pole face of the stator is substantially increased due to presence of this first magnetic body, and an entrapping rate of the magnetic flux from the rotor magnet is enhanced, whereby magnetic efficiency is improved. As the results, it has become possible to improve rotation performance of the motor.

Moreover, the first magnetic body is provided in a space which has not been magnetically utilized in the related art. Therefore, design change is not necessary with respect to other existing members, and it is possible to increase torque with a structure of the same size, while the existing members are maintained at the same size as in the prior art.

According to the invention, the magnetic flux entrapped by the first magnetic body is guided to the tooth part along the second magnetic body with extremely small leakage, and the magnetic efficiency is further enhanced.

According to the invention, the entrapping-rate of the magnetic flux from the rotor magnet in the stator is enhanced, and it is possible to enhance the rotation performance of the motor with the structure of the same size.

DETAILED DESCRIPTION OF PREFERRED EMBODIMENTS

Figure 1:
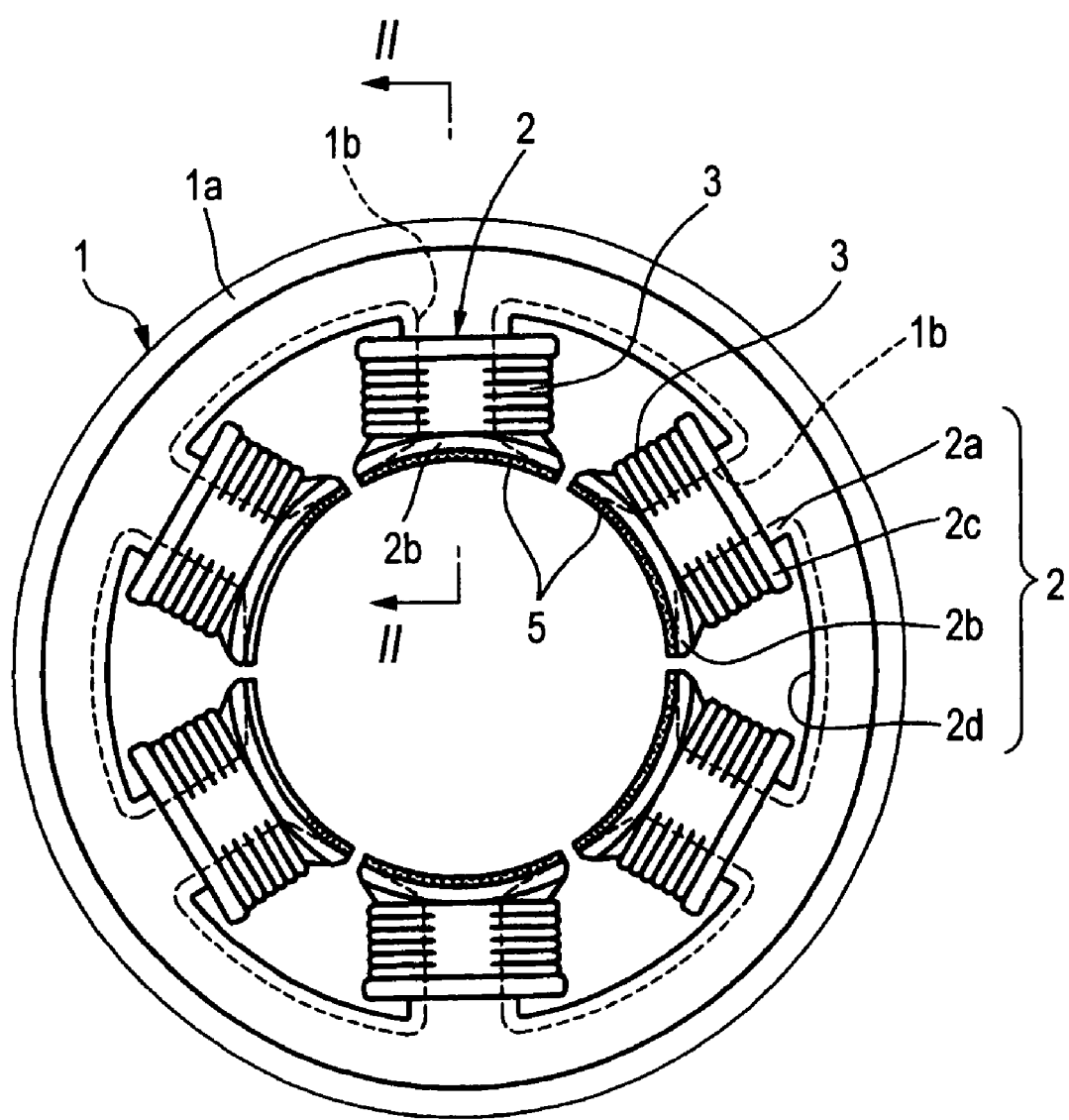
FIG. 1 is a front view of a stator of a motor in a first embodiment according to the invention.
Figure 2:
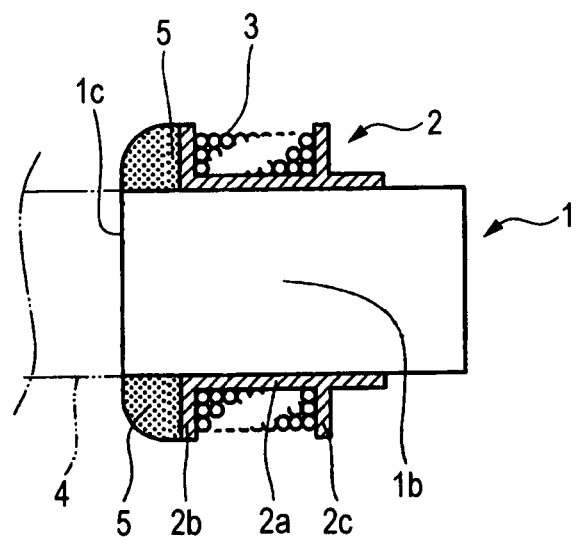
FIG. 2 is an enlarged sectional view taken along a line (ii)-(ii) in FIG. 1.
Figure 3:
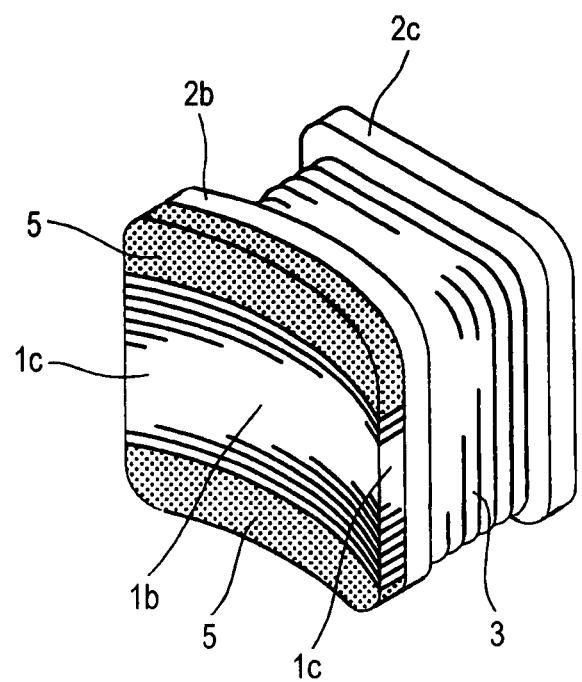
FIG. 3 is a perspective view of an essential part of the stator in FIG. 1.

Now, referring to the attached drawings, a stator of a motor according to an embodiment of the invention will be described. FIG. 1 is a front view of the stator of the motor in a first embodiment, FIG. 2 is an enlarged sectional view taken along a line (ii)-(ii) in FIG. 1, and FIG. 3 is a perspective view of an essential part of the stator in FIG. 1.

The stator in this embodiment has a stator core 1 which is annularly continued. The stator core 1 is formed of laminated magnetic steel sheets, and includes a stator core body 1a in an annular shape and a plurality (six in the illustrated embodiment) of tooth parts 1b which are projected inward in a radial direction from the stator core body 1a, equidistantly along an inner circumferential direction thereof. Protruded parts 1c, 1c (shown in FIGS. 2 and 3) which are protruded to opposite sides in a circumferential direction are integrally formed at a distal end (a side opposed to the rotor) of each of the tooth parts 1b.

A coil 3 is wound around each of the tooth parts 1b of the stator core 1 by way of an insulator 2. The insulator 2 which is clamped by the stator core 1 from opposite sides in an axial direction of the stator is formed of resin or the like, and has a body part 2a which is engaged with an outer peripheral part of the tooth part 1b of the stator core 1, and flange parts 2b, 2c which are projected from this body part 2a in an outer circumferential direction. The two body parts 2a, 2a . . . which are adjacent to each other in the circumferential direction are annularly connected by means of a connecting part 2d. Out of the two flange parts 2b, 2c of the insulator 2, the flange part 2b positioned at the distal end side of the tooth part 1b is curved along a rotation orbit of a rotor 4 (a part of the rotor 4 is shown by a dotted line in FIG. 2), in the same manner as the protruded parts 1c at the distal end side of the tooth part 1b.

The coil 3 is wound around the tooth part 1b of the stator core 1 by way of the aforesaid insulator 2, according to the so-called concentrated winding method. Specifically, the coil 3 is wound around the body part 2a of the insulator 2, after the body part 2a has been fitted to the tooth part 1b of the stator core 1 from opposite sides in the axial direction.

The invention is characterized by a structure of the insulator 2 in a region opposed to the rotor 4. As clearly shown in FIGS. 2 and 3, two first magnetic bodies 5 are provided on a surface of the flange part 2b of the insulator 2 at the distal end side of the tooth part 1b which is opposed to the rotor 4, at opposite sides of an end surface of the tooth part 1b which functions as the magnetic pole face of the stator.

In this embodiment, each of the first magnetic bodies 5 is a thin plate formed of ferrite, ferrous metal or the like, and spreads in the circumferential direction along the protruded parts 1c of the tooth part 1b. The first magnetic body 5 is brought into contact with the distal end portion of the tooth part 1b or the protruded parts 1c, thereby to be magnetically connected to the tooth part 1b. It would be preferable that a surface of the first magnetic body 5 is in flush with the distal end surface of the tooth part 1b and the protruded parts 1c. It is also possible to position the first magnetic body 5 very close to the tooth part 1b leaving a minute gap, thereby to achieve magnetic connection between them.

In case where the first magnetic body 5 is formed as a thin plate as described above, the first magnetic body 5 may be attached to the distal end surface of the flange part 2b by an adhesive, for example. However, it is also possible to form the first magnetic body 5 integrally with the flange part 2b by insert molding, or to attach the first magnetic body 5 in a form of a film by plating. Anyway, means for attaching the first magnetic body 5 to the flange part 2b is not particularly limited.

According to the above described structure, the two first magnetic bodies 5 exist in the state magnetically connected to the tooth part 1b, at opposite sides of the distal end of the tooth part 1b in the axial direction. Consequently, an area of the magnetic pole face of the stator substantially spreads to opposite sides in the axial direction by the presence of these first magnetic bodies 5, and the entrapping rate of the magnetic flux from the rotor magnet is enhanced.

Figure 4:
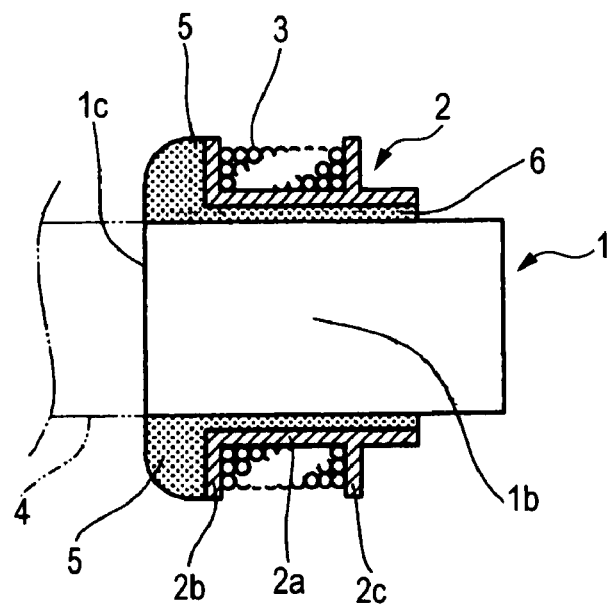
FIG. 4 is an enlarged sectional view of an essential part of a stator of a motor in a second embodiment according to the invention.

FIG. 4 is an enlarged sectional view of an essential part of a stator in a second embodiment according to the invention. In this second embodiment, the first magnetic bodies 5 are provided on the surface of the flange part 2b of the insulator 2 at the distal end side of the tooth part 1b which is opposed to the rotor, at opposite sides of the end surface of the tooth part 1b which functions as the magnetic pole face of the stator, in the same manner as in the first embodiment. In addition, second magnetic bodies 6 are provided on an inner peripheral surface of the body part 2a of the insulator 2 so as to be in contact with an outer peripheral surface of the tooth part 1b. In the illustrated embodiment, the second magnetic bodies 6 are integrally formed with the first magnetic bodies 5, although it would be sufficient that the second magnetic bodies 6 are magnetically connected to the first magnetic bodies 5. This embodiment is substantially the same as the first embodiment in other structures, and so, members corresponding to those members in the first embodiment are denoted with the same reference numerals, and their detailed description will be omitted.

According to this embodiment, the magnetic flux entrapped by the first magnetic bodies 5 is guided to the tooth part 1b along the second magnetic bodies 6, whereby leakage of the magnetic flux is reduced, and the magnetic efficiency is further enhanced.

In the above described embodiment, the coil 3 is wound around the tooth part 1b of the stator core 1 by way of the insulator 2 according to the concentrated winding method. However, it is possible to wind the coil 3 according to another method. Specifically, the coil may be wound around the insulator in advance to form a unit, before the insulator is mounted on the tooth part. Then, this unit of the insulator and the coil is fitted over the tooth part, whereby the coil can be wound around the tooth part by way of the insulator. In the stator which has been assembled according to the above described method, the distal end of the tooth part is not provided with the protruded parts, because the unit of the insulator and the coil has been fitted over the tooth part. The end surface of the tooth part which functions as the magnetic pole face of the stator has a size to be engaged with the inner periphery of the body part of the insulator.

Figure 5:
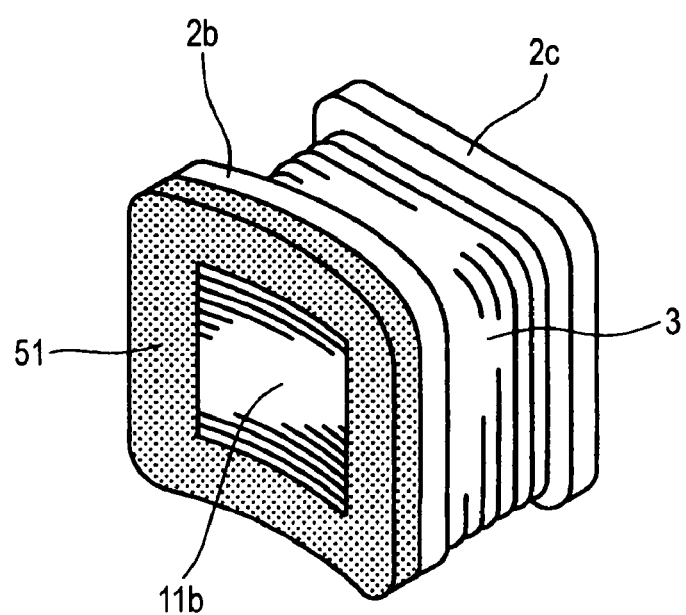
FIG. 5 is a perspective view of an essential part of a stator in a third embodiment according to the invention.
Figure 6:
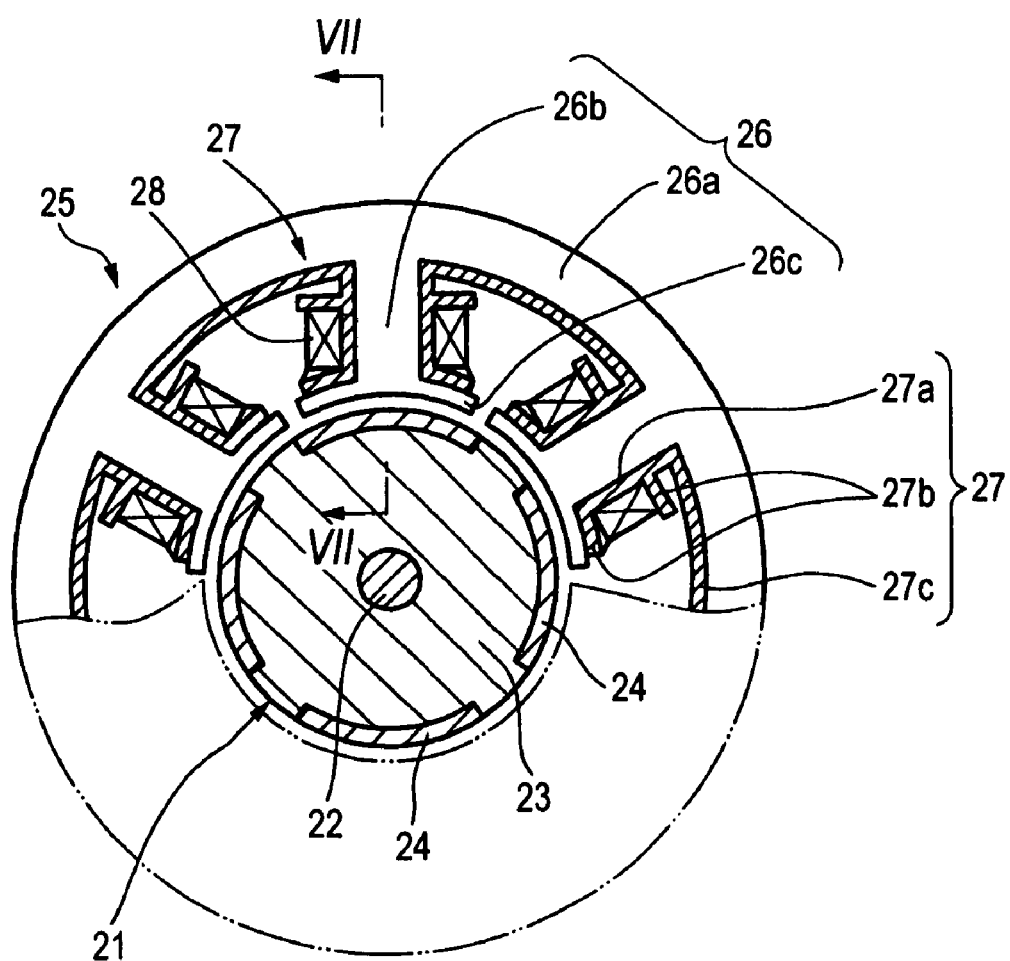
FIG. 6 is a sectional view of a part of a conventional brushless motor of inner rotor type.
Figure 7:
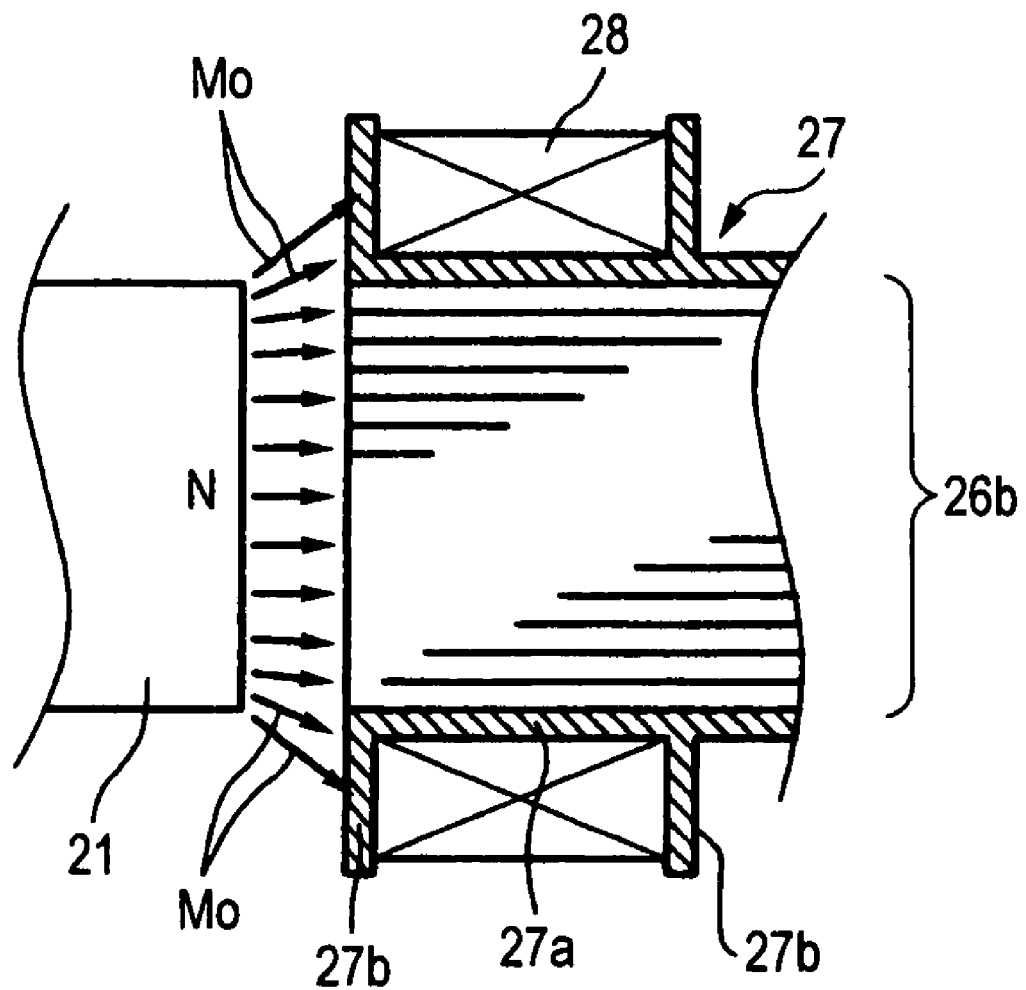
FIG. 7 is an enlarged sectional view taken along a line (vii)-(vii) in FIG. 6.

A structure as shown in FIG. 5 may be employed for the tooth part which has no protruded part at the distal end thereof, as described above. FIG. 5 is a perspective view of an essential part of a stator in a third embodiment according to the invention.

In FIG. 5, a first magnetic body 51 is formed on a surface of the flange part 2b of the insulator 2 at the distal end side of the tooth part 11b opposed to the rotor so as to enclose the end surface of the tooth part 11b. The first magnetic body 51 in this embodiment spreads in the circumferential direction and in the axial direction along the surface of the flange part 2b at the distal end side. The first magnetic body 51 is in contact with the tooth part 11b at its inner peripheral part, thereby to be magnetically connected to the tooth part 11b.

According to the above described structure, the area of the magnetic pole face of the stator spreads both in the circumferential direction and in the axial direction through the first magnetic body 51, and the entrapping rate of the magnetic flux from the rotor magnet is enhanced.

This invention can be applied to the stator of not only the brushless motor but also other motors, provided that the motors are of inner rotor type.

What is claimed is:

1. A stator of a motor comprising:
an annular stator core;
tooth parts that project inward from, the stator core in a radial direction of the stator core;
insulators each having a body part engaged with an outer peripheral surface of the tooth part, each of the insulators including a flange part that is protruded at an end side of the tooth part, the flange part having a front surface facing a center of the stator core;
coils, each wound around the tooth part by way of the insulator; and
first magnetic bodies, each provided on a surface of the flange part so as to be opposed to a rotor, the first magnetic bodies being magnetically connected to the tooth part,
wherein a protruded part extends from a distal end surface of the tooth part, the distal end surface facing the center of the stator core, a first magnetic body of the first magnetic bodies being disposed on the front surface of the flange and along opposite side surfaces of the protruded part, the first magnetic body being flush with the distal end surface of the tooth part and the opposite side surfaces of the protruded part.

2. The stator according to claim 1, further comprising second magnetic bodies, each provided on an inner periphery of the body part of the insulator and contacting with the outer peripheral surface of the tooth part, the second magnetic body being magnetically connected to the first magnetic body.

3. The stator according to claim 2, wherein said second magnetic bodies and said first magnetic bodies are integral.

4. The stator according to claim 1, wherein said insulators are clamped by said stator core from opposite sides in an axial direction.

5. The stator according to claim 1, wherein said coils are wound around said body part of said insulators, said body part being fitted to the tooth parts of said stator core from opposite sides in an axial direction.

6. The stator according to claim 1, wherein said first magnetic bodies comprise a thin plate, which extends in a circumferential direction along the protruded part of said tooth parts.

7. The stator according to claim 1, wherein said flange part and said first magnetic bodies are integral.

8. The stator according to claim 1, wherein the first magnetic body is integrally formed with the insulator.

9. The stator according to claim 1, further comprising second magnetic bodies extending from said first magnetic bodies along an inner peripheral surface of the body part and along an outer peripheral surface of the tooth part.

10. A stator of a motor comprising:
a stator core;
a tooth part that projects from the stator core;
an insulator having a body part engaged with the tooth part, said insulator including a flange part protruding from at an end of the tooth part, the flange part having a front surface facing a center of the stator core; and
a first magnetic body magnetically connected to the tooth part,
wherein a protruded part extends from a distal end surface of the tooth part, the distal end surface facing the center of the stator core, the first magnetic body being disposed on the front surface of the flange and along opposite side surfaces of the protruded part, the first magnetic body being flush with the distal end surface of the tooth part and opposite side surfaces of the protruded part.

11. The stator according to claim 10, wherein the first magnetic body is integrally formed with the insulator.

12. A suitor of a motor comprising:
a stator core;
a tooth part that projects from the stator core;
an insulator having a body pan engaged with the tooth part, said insulator including a flange part protruding from at an end of the tooth part, the flange part having a front surface facing a center of the stator core;
a first magnetic body magnetically connected to the tooth part; and
a second magnetic body magnetically connected to the first magnetic body,
wherein a protruded part extends from a distal end surface of the tooth part, the distal end surface facing the center of the stator core, the first magnetic body being disposed on the front surface of the flange and along opposite side surfaces of the protruded part, the first magnetic body being flush with the distal end surface of the tooth part and opposite side surfaces of the protruded part.

13. The stator according to claim 12, wherein said second magnetic body and said first magnetic body are integral.

14. The stator according to claim 12, wherein the first magnetic body is integrally formed with the insulator.

* * * * *